United States Patent [19]

Grossman

[11] Patent Number: 5,223,839
[45] Date of Patent: Jun. 29, 1993

[54] RADAR IDENTIFICATION

[75] Inventor: Sidney J. Grossman, Asbury Park, N.J.

[73] Assignee: The United States of America as represented by the Secretary of the Army, Washington, D.C.

[21] Appl. No.: 57,849

[22] Filed: Jun. 1, 1970

Related U.S. Application Data

[63] Continuation-in-part of Ser. No. 758,655, Sep. 5, 1968, abandoned, which is a continuation-in-part of Ser. No. 560,387, Jun. 23, 1966, abandoned.

[51] Int. Cl.$^5$ .............................................. G01S 13/87
[52] U.S. Cl. .................................... 342/43; 342/6; 342/45
[58] Field of Search ............... 343/6.5, 6.8, 7.3, 7.7, 343/100 TD, 5 CD; 342/6, 43, 45

[56] References Cited

U.S. PATENT DOCUMENTS

| | | | |
|---|---|---|---|
| 2,691,162 | 10/1954 | Geer | 343/6.5 |
| 2,966,675 | 12/1960 | Smoll | 343/6.5 |
| 3,090,956 | 5/1963 | Woodward, Jr. et al. | 343/100 SA |
| 3,150,320 | 9/1964 | Gruenberg | 343/100 TD |
| 3,267,467 | 8/1966 | Gerardin et al. | 343/7.7 |
| 3,296,615 | 1/1967 | Page et al. | 343/6.5 |
| 3,312,970 | 4/1967 | Bond | 343/6.5 |
| 3,371,345 | 2/1968 | Lewis | 343/6.8 |
| 4,322,729 | 3/1982 | Honold et al. | 342/45 |
| 4,347,512 | 8/1982 | Sweeney | 342/6 |

Primary Examiner—T. H. Tubbesing
Attorney, Agent, or Firm—Michael Zelenka; William H. Anderson

[57] ABSTRACT

An improved passive IFF system operating as a supplement to a conventional radar system including a coded variable delay system to produce like time-coded variable phase delayed identifying signal components indicative of cooperating or friendly objects and which overlap signals of other reflecting echo signals from the objects. The IFF system is provided with a retro-directive type antenna. The overlapping cooperating or friendly signal components and the corresponding other echo reflecting object signals are simultaneously detected at the radar system which is provided with a compensating or complementary phase delay means time coded in the same manner as the identifying IFF signal components. The identifying IFF signal components are thus produced in uniform phase and are summed up to provide a signal at the radar system whose magnitude is relatively large as compared to the combined corresponding echo reflecting signals which are in random-phase relationship. The receiver is provided with an indicator to distinguish between the in-phase-identifying signal components and the random-phase corresponding echo reflector signals.

7 Claims, 1 Drawing Sheet

RADAR IDENTIFICATION

The invention described herein may be manufactured, used, and licensed by or for the Government for governmental purposes without the payment to me of any royalty thereon.

CROSS REFERENCE TO RELATED APPLICATION

This application is a continuation-in-part of application Ser. No. 04/758,655, filed Sep. 5, 1968, which in turn is a continuation-in-part of application Ser. No. 04/560,387, filed Jun. 23, 1966, both now abandoned, for Radar Identification by Sidney J. Grossman.

BACKGROUND OF INVENTION

The present invention relates to echo detection stations such as Radar for mobile object direction, range, and velocity determination, and particularly to auxiliary identification equipment at such stations and also on cooperating or friendly mobile objects for identification friend or foe (IFF). Since mobile objects often include a radar station, and fixed stations may require identification to avoid attack by friendly equipped objects, each may involve both detection and IFF operation.

Many variations of such auxiliary equipment have been used. Wolff U.S. Pat. No. 2,885,665 illustrates a mere coded keying of a passive reflector or re-radiator for the actual radar signals, thus varying echo amplitude on radar display. The prearranged coding minimizes analysis of the signal and synthesis of a false signal by the enemy. Charrier U.S. Pat. No. 2,453,970 illustrates a coded and substantially delayed active re-transmitter, thus providing an additional delayed echo on radar display. Because of the wide variety of basic radar equipments, in many frequency bands, it has been common to provide with each radar auxiliary low power transmitters all on one IFF frequency unrelated to the radar. Actually IFF re-transmission may use another frequency, and coding may be used both ways, to minimize jamming as well as false reply from enemy objects.

It will be helpful to recognize certain IFF terms:

Transponder on objects, an active re-transmitter, as in Charrier and common IFF;

Responder on object, a term here used for the alternative passive re-radiator, as in Wolff;

Responsor at station, an accepted by somewhat inapt term for common IFF receiver, here replaced by receiver-processor, to emphasize the distinction from the term Responder as used above;

Interrogator at station, an IFF transmitter as in common IFF, sometimes applied to Radar transmitter also.

SUMMARY OF THE INVENTION

It is an object of the present invention to provide an improved IFF system for use with radars which is capable of "one-way" operation, i.e. no interrogation required, and provide a simpler but more effective identification system.

In accordance with the present invention there is provided a microwave energy object detection system having a transmitter, receiver and indicator. Included on the objects to be identified are means responsive to energy from the transmitter for producing re-radiated, time-coded, phase-delayed identifying signal components indicative of friendly objects simultaneously with intentionally overlapping reflected echo signal components. The time-coded, phase-delayed identifying signal components are re-radiated retro-directively in accordance with the direction of the microwave energy source. The identifying signal components are detected at the receiver simultaneously with the intentionally overlapping reflected echo signal components. Also included are means responsive to the detected signal outputs of the receiver and time coded in the same manner as the identifying signal components whereby the re-radiated identifying signal components are maximized in comparison to the intentionally overlapping reflected echo signal components. The maximized signal is such that its amplitude is greater than a prescribed threshold value. Included further are uncoded means responsive to the combined detected receiver output signals for producing a minimized signal below the maximized signal level. Also included are means on the indicator which is responsive to the maximized and minimized signals for distinguishing therebetween.

BRIEF DESCRIPTION OF THE DRAWING

For a better understanding of the invention, together with further objects thereof, reference is made to the following description taken in connection with the accompanying drawing in which.

DESCRIPTION OF THE PREFERRED EMBODIMENT

Figure 1:
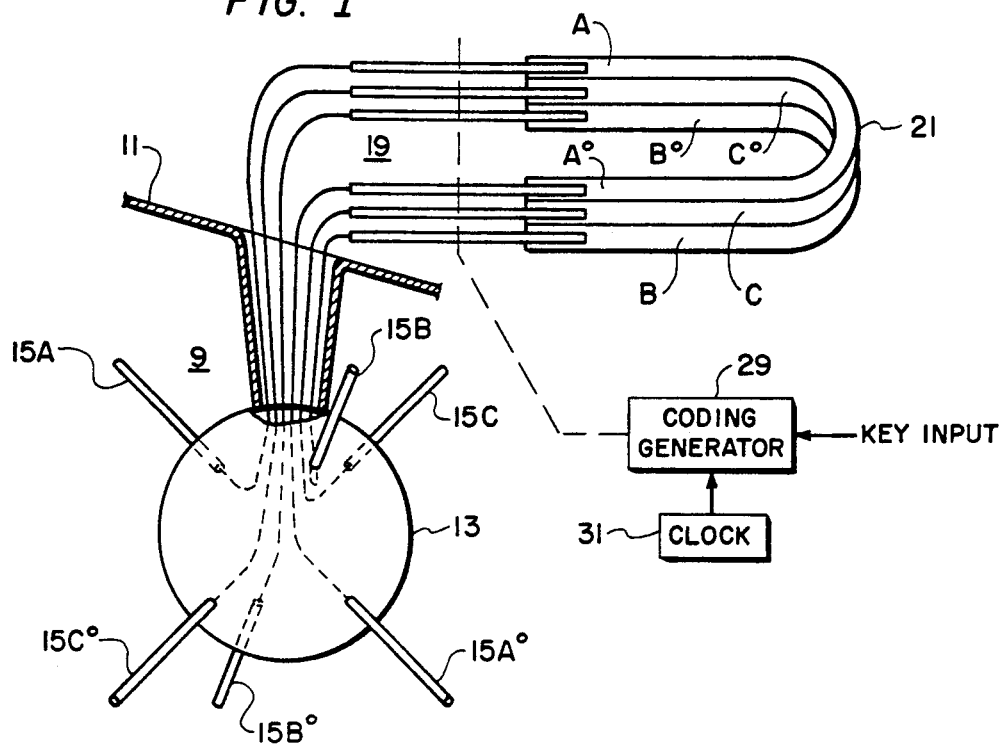
FIG. 1 shows one simple form of responder (passive) installation as might be used on aircraft.

Referring now to FIG. 1 of the drawing, at 9 there is shown a typical retro-directive antenna array as might be used on a mobile object such as an airplane. A lower surface 11 of the airplane or other objects support a sphere 13, illustrating members 15A, 15A°, 15B, 15B°, 15C and 15C°. The three pairs of opposite members are mutually at right angles, corresponding to usual rectangular coordinate axes, except for uncovertional orientation with one (of 8) midpoints between such axes at the top. Usual axes would also correspond to polar and two equatorial axes of a globe map at 0°, 180° and 90°, 270° meridians. Thus, although not essential to operation, all three axes are shown most effectively as mutually symmetrical, and the mounting as symmetrical to the three.

The antenna structure 9 is exemplary only to indicate retro-directive antennas such as the Luneberg lens and Van Atta antenna well known in the art. However, in addition to re-radiation of incident energy, the echo or skin component of the mobile object is also radiated so that, in effect, the skin echo, the re-radiated incident energy as well as clutter may be said to comprise intentionally overlapping and accompanying components.

At 19 there is shown a variable delay device, herein illustrated in the form of a multiple trombone-slide, having electromagnetic waveguide tubes 21 connecting to the several pair of antenna members identified by corresponding letter. The sliding or delay varying portions of the waveguide tubes are ganged so as to move in unison and are positioned in accordance with a well known coding generator device as at 29, the output of which, in turn, is controlled by a clock mechanism 31. By such an arrangement, the delay for each pair of antenna members is made equal every time the slides or trombone waveguides are activated in unison. It is to be understood of course that other type controlled delay devices such as tapped delay lines may be used in place of the variable delay device shown in 19. When the target is illuminated by a radar, the need for identification is established since a conventional echo will be detected. Depending on the coded key, the retro-directive or responder antenna 9 will re-radiate microwave signals back in the direction of incidence but with controlled delays added to the re-radiated signals. Since the delays in each of the connecting delay paths are equal, whatever the direction of the incident wave, the output from antenna 9 will be automatically correctly phased for re-transmission in the same direction, that is, retro-directive. It is to be understood of course that the system hereinabove described operates as a passive reflector system.

Figure 2:
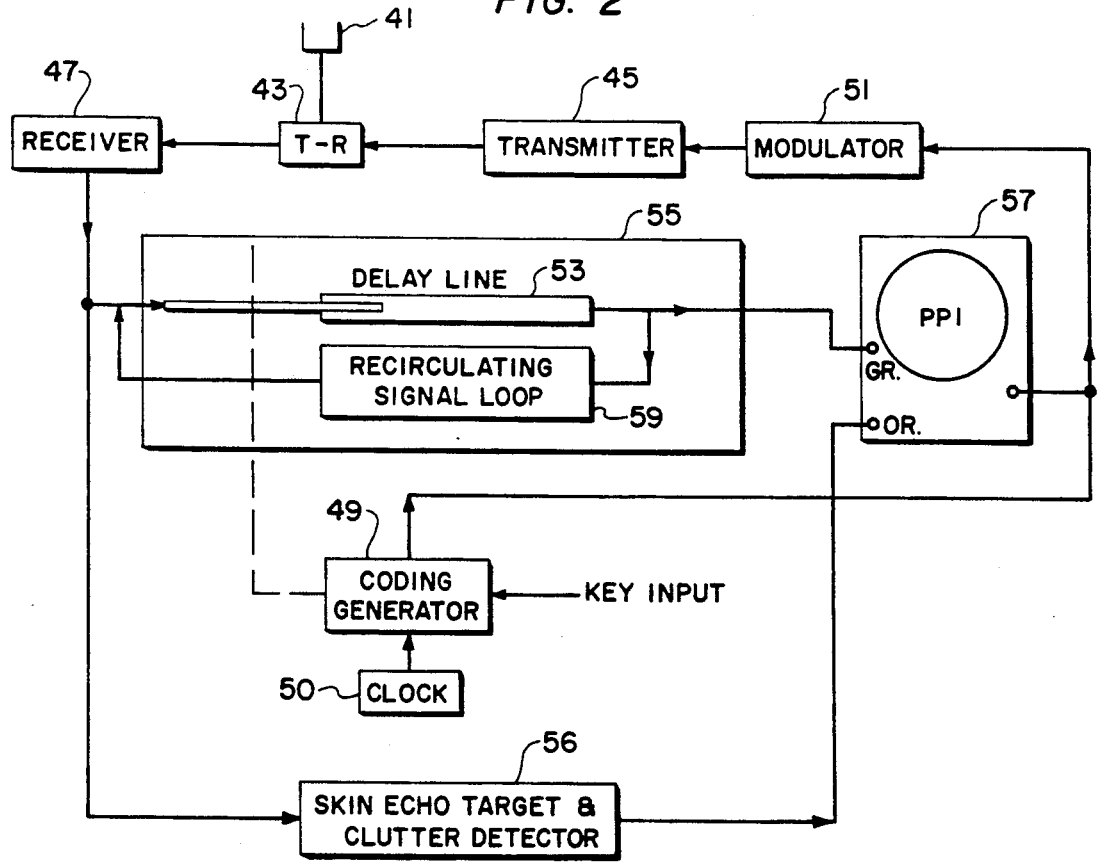
FIG. 2 shows one simple installation of a radar system for determining whether or not the aircraft may be recognized as friendly.

FIG. 2 shows a typical radar station including antenna 41, connected through duplexer 43 to both transmitter 45 and receiver 47. The radar transmitter 45 is assumed to be operated at a prescribed PRF rate initiated by the output of coder generator 49 or any other suitable timing source. However, coder generator 49 is preprogrammed in accordance with coding generator 29 in antenna structure 9. As shown, the output of receiver 47 is applied to a sweep integrator circuit 55. As is well known in the art, the term "sweep integrator" is applied to those circuits wherein the system stores at one time all echoes received from a particular transmitted pulse. These echoes comprise one radar sweep. Basically, sweep integrator 55 includes a variable delay line as at 53, which is effectively a memory circuit, with a controlled feedback circuit coupling the output of the delay line 53 to the input thereof to form a recirculating signal loop 59. As is well known, sweep integrators operate on the principle that the frequency distribution of a recurrent series of pulses is a line spectrum with the line located at harmonics of the pulse repetition frequency whereon the spectrum of random noise and clutter signals is more or less uniformly distributed over the entire video pass band. The sweep integrator 55 is so constructed and arranged that strong periodic signals representing desired received target echoes add linearly in the recirculating loop 59 while aperiodic signals resulting from general clutter add in the more gradual root mean square manner. As a result, the signal-to-noise and/or clutter ratio in the recirculating loop 59 is greater than the corresponding ratio of unintegrated signals. The improvement of the signal-to-noise ratio and/or clutter ratio is a function of the number of successive desired pulse series stored as a sum in the recirculating loop. In a typical application of the sweep integrator it may be desirable to store with appreciable strength the sum of as many as 50 to 100 successive series within the recirculating loop. The variable delay line 53 is similar to the delay line 19 of FIG. 1. One typical example of a sweep integrator applicable to the system hereabove described is shown in Sunstein U.S. Pat. No. 2,736,021, "Signal Integrating System." As shown, the coder generator 49, which in turn is controlled by, a clock mechanism 50, provides the coded control of variable delay line 53 of the sweep integrator 55. By means of the coder generator device 49, the variable delay device 53 is set to insert a delay of the received re-radiated, retro-directive signal in complementary amounts. For example, the delay line 53 is set to provide a delay that is the complement of that set in responder delay line 19. The term "complement" refers to the difference between the maximum delay that would be provided by line 19 and the actual delay set by coder 29 of FIG. 1. Thus for a pre-coded signal at a prescribed PRF rate from radar station transmitter 45, the pre-coded or controlled delay in line 19 of retro-directive antenna 9, FIG. 1 will have its complementary delay value encoded in delay line 53. Accordingly, the intended delay of line 53 plus the delay attributed to line 19 is a constant. As an example, if $R_1$ is the set or pre-coded delay of line 19 for the identifying signal for receiver 47, and $T_2$ is the properly set coded complement for $T_1$, then $T_1+T_2=$ Constant. The same result could be achieved if the delay of line 53 were made to be the reciprocal of the delay of responder delay line 19. In this type of operation, the product of $T_1$ and $T_2$ is made equal to unity. Since the delay derived from delay line 53 plus the delay from delay line 19 in the antenna 9 is made to be a constant, coherent or periodic in-phase signals are provided for each radar sweep. As explained above, sweep integrator 55 provides a maximum amplitude output for such periodic in-phase signals applied thereto, and a lesser or minimum amplitude for the signals resulting from the overlapping and corresponding skin echo and general clutter signals also appearing at the output of integrator 55. Thus, integrator 55 will provide a maximum output for the coherently added in-phase identifying signals to provide a signal of friendly identification. For the non-coherent signals such as clutter and skin echoes, the threshold will be minimized or much lower than that of the in-phase coherent signals and hence will not affect the maximum or friendly decision level of the integrator 55. Although the description above utilized a sweep integrator, it is to be understood that the invention is not to be limited thereto. For example, the variable delay line 53 and recirculating signal loop 59 may be a separate and discrete unit which can be adapted to operate with a suitable integrator to achieve the same result as that achieved by sweep integrator 55. As hereinabove noted, the coders in both the responder, i.e. mobile object, and the receiver-processor (sensor) are properly synchronized by means of the clock mechanism at both the radar station and mobile object. The code generator at the mobile target responder has been given a key setting which determines the sequence of the delays in delay network 19. A radar signal received will be delayed prior to re-radiation by a particular amount selected by the coding generator 29. The coder generator 49 at the receiver-processor, with the same key setting, selects the proper reciprocal or complementary delays as hereinabove explained. However, it is to be understood that the normal indication of a received radar signal may be detected by a suitable detector as at 56. To emphasize the distinction between the normal received radar signals and the IFF identifying component derived from sweep integrator 55, they are illustrated or portrayed in respective different colors on PPI indicator 57. Any other suitable technique such as spacial symbology may also be used to differentiate the signals.

It will now be helpful to summarize the various properties of this new technique. Although pulse radar has been assumed as most familiar for purpose of explanation, the same responder can serve for other forms of electromagnetic or even sound echo. For a high degree of security in indentifying vehicles, especially airbourne, more sophisticated coding systems might be used than for foot-soldiers, etc. The simple passive responder as described in most readily designed for broadband operation and most immune to overloading or intentional jamming. For more powerful response compared to antenna size active transponders may be used. They would be somewhat more subject to jamming, or mere overloading, and more likely to reveal the technique before otherwise known to enemy. Elimination of IFF interrogator simplifies apparatus and reduces distinguishable IFF radiation helpful to enemy in identifying our radar stations. Enemy radar would receive the small IFF phase components but without having the code would have great difficulty even to realize their presence in the stronger skin echoes. In some cases prior integrators could also apply to the new operation.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In a microwave energy echo object detection system having a transmitter, receiver and indicator, means on said objects responsive to microwave energy from said transmitter for producing re-radiated, time-coded, phase-delayed identifying signal components indicative of friendly objects simultaneously with intentionally overlapping reflected echo signal components, said time-coded, phase-delayed, identifying signal components being re-radiated retro-directively in accordance with the direction of the microwave energy source, means responsive to the detected signal outputs of said receiver and time coded in the same manner as said identifying signal components whereby the re-radiated identifying signal components are maximized in comparison to said intentionally overlapping reflected echo signal components, said maximized signal having an amplitude greater than a prescribed threshold value, uncoded means responsive to the combined detected receiver output signals for producing a minimized signal below said maximized signal level, and means on said indicator responsive to said maximized and said minimized signals for distinguishing therebetween.

2. The system in accordance with claim 1 wherein said maximized signal producing means comprises a sweep integrator.

3. The system in accordance with claim 1 wherein the identifying signal components producing means comprises passive reflectors.

4. The system in accordance with claim 3 wherein said maximized signal producing means comprises a sweep integrator.

5. The system in accordance with claim 3 wherein said passive reflectors include a retro-directive antenna system.

6. The system in accordance with claim 4 wherein said passive reflectors include a retro-directive antenna system.

7. The system in accordance with claim 2 wherein the input of said sweep integrator includes a variable delay line and a recirculating signal loop thereacross, and further comprising means for providing along said delay line a phase delay for said detected re-radiated identifying signal components which is a complement of the phase-delay for said identifying signal components on said objects and time coded in the same manner as said identifying signal component on said objects.

* * * * *